US008655485B2

(12) United States Patent
Garber et al.

(10) Patent No.: US 8,655,485 B2

(45) Date of Patent: Feb. 18, 2014

(54) VENDING MACHINE AND CONTROL SYSTEM FOR PASSENGER VEHICLE-FOR-HIRE

(75) Inventors: Shaun F. Garber, New York, NY (US); Vladimir Shaposhnikov, Brooklyn, NY (US)

(73) Assignee: U.S.A. Vendicab Corp., Long Island City, NY (US)

(*) Notice: Subject to any disclaimer, the term of this patent is extended or adjusted under 35 U.S.C. 154(b) by 303 days.

(21) Appl. No.: 12/884,643

(22) Filed: Sep. 17, 2010

(65) Prior Publication Data

US 2011/0071669 A1 Mar. 24, 2011

Related U.S. Application Data

(63) Continuation-in-part of application No. PCT/US2010/027762, filed on Mar. 18, 2010.

(60) Provisional application No. 61/161,288, filed on Mar. 18, 2009, provisional application No. 61/230,417, filed on Jul. 31, 2009.

(51) Int. Cl.
*G06F 17/00* (2006.01)

(52) U.S. Cl.
USPC ............ 700/242; 700/232; 700/238; 221/192

(58) Field of Classification Search
USPC ........................... 700/232, 238, 242; 221/192
See application file for complete search history.

(56) References Cited

U.S. PATENT DOCUMENTS

| | | | | |
|---|---|---|---|---|
| 3,172,713 | A | 3/1965 | Rupert | |
| 5,247,798 | A | 9/1993 | Collard | |
| 5,447,407 | A | 9/1995 | Weaver et al. | |
| 5,497,918 | A * | 3/1996 | Brilanchik | 222/626 |
| 6,056,425 | A | 5/2000 | Appelberg | |
| 6,234,345 | B1 | 5/2001 | Minh et al. | |
| 6,321,934 | B1 * | 11/2001 | Immel | 221/192 |
| 6,397,608 | B1 | 6/2002 | Sakuma et al. | |
| 7,418,311 | B1 | 8/2008 | Lagassey et al. | |
| 8,152,023 | B2 * | 4/2012 | Hatuka | 221/96 |
| 2002/0164962 | A1 | 11/2002 | Mankins et al. | |
| 2004/0249502 | A1 * | 12/2004 | Truong et al. | 700/232 |

* cited by examiner

*Primary Examiner* — Timothy Waggoner

(74) *Attorney, Agent, or Firm* — McCarthy Fingar LLP; Peter D. Aufrichtig

(57) ABSTRACT

A vending machine and associated control system in support of vending one or more items to a passenger in a rear passenger salon of a taxicab includes a computer having a processor and memory and a display arranged for viewing by the passenger. Code modules execute in the processor and provide interactive selection controls on at least a portion of the display. The passenger can cause an item to be vended from a remotely-located machine by interacting with the selection controls. One code module communicates vended item cost information to another module for inclusion in a calculation of a total fare for the taxicab ride and any vended items. The vending machine is preferably located in the taxicab trunk and is arranged to deliver items into the passenger salon through a rear deck of the taxicab. The vending machine can be refrigerated using, in part, the taxicab's air-conditioning system.

14 Claims, 6 Drawing Sheets

VENDING MACHINE AND CONTROL SYSTEM FOR PASSENGER VEHICLE-FOR-HIRE

CLAIM OF PRIORITY

This application is a continuation-in-part of PCT application PCT/US2010/027762, entitled "Passenger Vehicle-For-Hire Vending Machine with Refrigeration," filed Mar. 18, 2010, which claims priority to U.S. Provisional Application Nos. 61/161,288, entitled "Passenger Vehicle-For-Hire Vending Machine with Refrigeration," filed Mar. 18, 2009, and 61/230,417, entitled "Passenger Vehicle-For-Hire Vending Machine with Refrigeration," filed Jul. 31, 2009, which are hereby incorporated by reference in their respective entireties.

FIELD OF INVENTION

The present invention relates to vending machines installed in passenger vehicles-for-hire (e.g., taxi cabs), and in particular to refrigerated vending machines that are designed for minimal impact on the vehicle's passenger/load capacity and control systems therefor.

BACKGROUND OF THE INVENTION

U.S. Pat. No. 3,172,713 of Rupert discloses a vending machine incorporated into the back of a passenger seat. The vending machine can vend small items, but does not accommodate refrigerated items.

U.S. Pat. No. 7,418,311 of Lagassey et al. discloses equipment that dispenses refreshing drinks and dry fruit from a golf-cart. The disclosed vending machine, includes three parts: a top part for holding snacks; a middle part for holding beverages; and a bottom part which is a refrigeration unit. The three parts are contained within a housing that fits within the basket of a golf cart. Because of the large size of its housing, Lagassey et al. discloses that the vending machine can be mounted on the roof of the golf cart, or towed behind in a trailer unit. Such a configuration could be useful for a golf cart where passengers stay with the vehicle for a long time, while leaving from the vehicle to play the game. However, this configuration is not suitable for the confines of a taxicab because the products would not be from within the passenger salon.

U.S. Pat. No. 6,234,345 of Minh et al. discloses a vending machine and cooling dispenser especially suited to environments with limited space. The dispenser is formed from two-pieces of rotary molded plastic having complimentary, serpentine surfaces which form a serpentine path when positioned against one another. Vending without selection buttons is achieved by way of cradles and an interlock system. Minh et al. disclose a vending machine directed for use in a bus. However, a vending machine suitable for placement in a coach bus with capacity for up to fifty or more passengers is not suitable for use in a taxi cab. The transportation vending machine of U.S. Pat. No. 6,234,345 has several disadvantages which prohibit it from being a commercially viable installation in a taxi cab. For example, taxi cabs in major cities and their surrounds often have a security partition between the front and rear seats. This partition results in a reduction in available space for placement of the disclosed vending machine. Any installation of Minh's vending machine in a taxi cab would be require significant alterations of the taxi cab's interior resulting in decreased passenger comfort, impediment of the passengers' ingress and egress, and a reduction in passenger load capacity.

The present invention provides a vending machine arrangement and a control system especially adapted for use by passengers with the salon of a taxicab.

SUMMARY OF THE INVENTION

Figure 1:
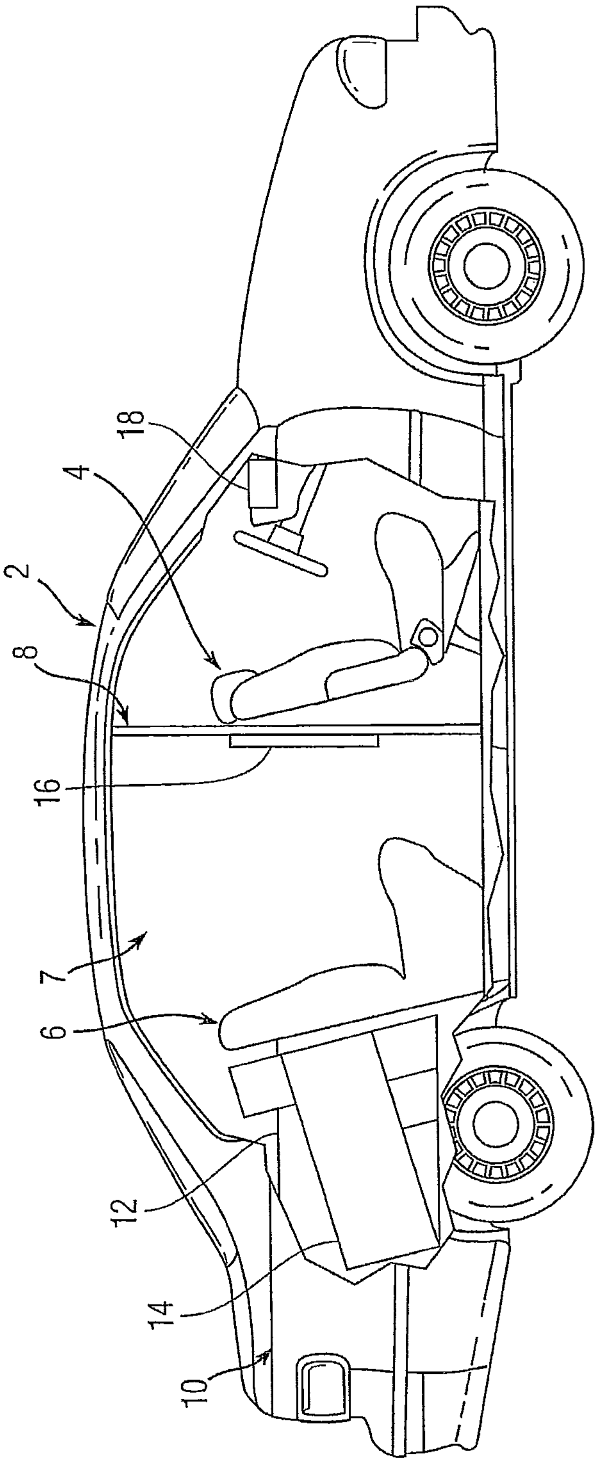
FIG. 1 illustrates a schematic sectional view of a taxi cab according to an exemplary embodiment of the present invention.

In accordance with one aspect of the present invention, a refrigerated vending system for installation in a taxicab is provided. The taxicab has a driver area, a trunk area, and a rear passenger salon having a rear passenger seat. A refrigerated vending machine is located in the trunk area and the vending machine is capable of vending items stored within the vending machine. An elevator is in communication with the refrigerated vending machine and is in communication with the rear passenger salon. The elevator receives a vended item from the vending machine at a first position and is capable of moving a vended item to a second position that is accessible from the rear passenger salon. The vending system includes an user interface accessible from the rear passenger salon. The user interface has a display for displaying information and selection controls corresponding to the information displayed on the display. The vending system includes a processor, a memory, and at least one module comprising code stored in the memory and executable in the processor so as to update the display with information concerning the items stored within the vending machine and respond to the selection controls of the user interface by causing the vended item to move to the first position and thereafter causing the elevator to move to the second position.

In accordance with a different aspect of the invention, a control system in support of vending one or more items to a passenger in a rear passenger salon of a taxicab is provided. The control system comprises a computer having a processor and a memory and a display oriented toward the rear passenger salon for viewing by the passenger. The control system further includes a first code module stored in the memory and executable in the processor so as to configure the processor to receive information in relation to transit of the passenger from one location to another and to calculate a fare. The control system includes a second code module stored in the memory and executable in the processor so as to configure the processor to present entertainment information to the passenger on the display. The control system includes a third code module stored in the memory and executable in the processor so as to configure the processor to provide interactive selection controls on at least a portion of the display. The third code module responds to interaction with the selection controls by the passenger by causing an item to be vended to the passenger that corresponds to a use of the selection controls and provides the first code module with information in relation to a cost of the item for inclusion in the calculation of the fare. The third code module causes a control signal to issue to a vending machine within the taxicab concerning the item to be vended. The control system includes a fourth code module stored in the memory and executable in the processor so as to configure the processor to output for payment by the passenger the calculated fare in view of the received information in relation to the transit of the passenger and in view of the item vended to the passenger, and to collect the calculated fare from the passenger.

Further aspects, features, and advantages of the invention can be appreciated from the accompanying description of certain embodiments thereof, taken together with the accompanying drawing figures.

DETAILED DESCRIPTION OF CERTAIN EMBODIMENTS OF THE INVENTION

Embodiments of the present invention provide an improvement of service to taxicab passengers by making available for purchase cool soft drinks, snacks and some non-food miscellaneous items through a convenient passenger-machine interface. Embodiments of the invention address the problems of the above-discussed prior art to create a refrigerator and vending machine that can be accommodated in the very limited space of taxi cab without needing to make any serious reconstruction of the vehicle or encroachment on the passenger salon. One such embodiment is extra flat and adaptable configuration of equipment that includes a vending machine located in the trunk of the taxicab. Embodiments of the invention address the problems of the above-discussed prior art to provide a unified payment system to account for the passenger ride and any vended item costs.

FIG. 1 illustrates a taxicab 2 that includes a front passenger seat 4 and a rear passenger seat 6 separated by a divider 8. The divider many not be present in all taxicabs. The taxicab includes a trunk area 10. A rear deck 12 extends behind the passenger seat 6 and separates the rear passenger salon 7 from the trunk area 10. The speakers for the car's radio system are typically mounted to opposite sides of the rear deck 12 in many cars. A vending machine 14 is located in the trunk 10 and is located at least partially underneath the rear deck 12. The rear deck 12 includes an access so that compartment 32 of the vending machine 14 can extend above the rear deck 12 so that it is accessible by a passenger seated in rear seat 6 in the passenger salon 7. The taxicab 2 also includes a user interface 16 and a fare meter 18. The user interface 16 can be supported by the divider 8, if present, or otherwise mounted for access within the passenger salon. For example, the user interface can be supported from the rear of a seat that is in front of the passenger, such as the driver or front passenger seat, or in the case of a taxicab having multiple rows of rear passenger seats (e.g., in a minivan or sport utility vehicle), the vending machine can be supported on the rear of one of the passenger seats. The user interface 16 can also be supported at other locations in the taxicab such that it is accessible from the rear passenger salon 7.

Figure 2:
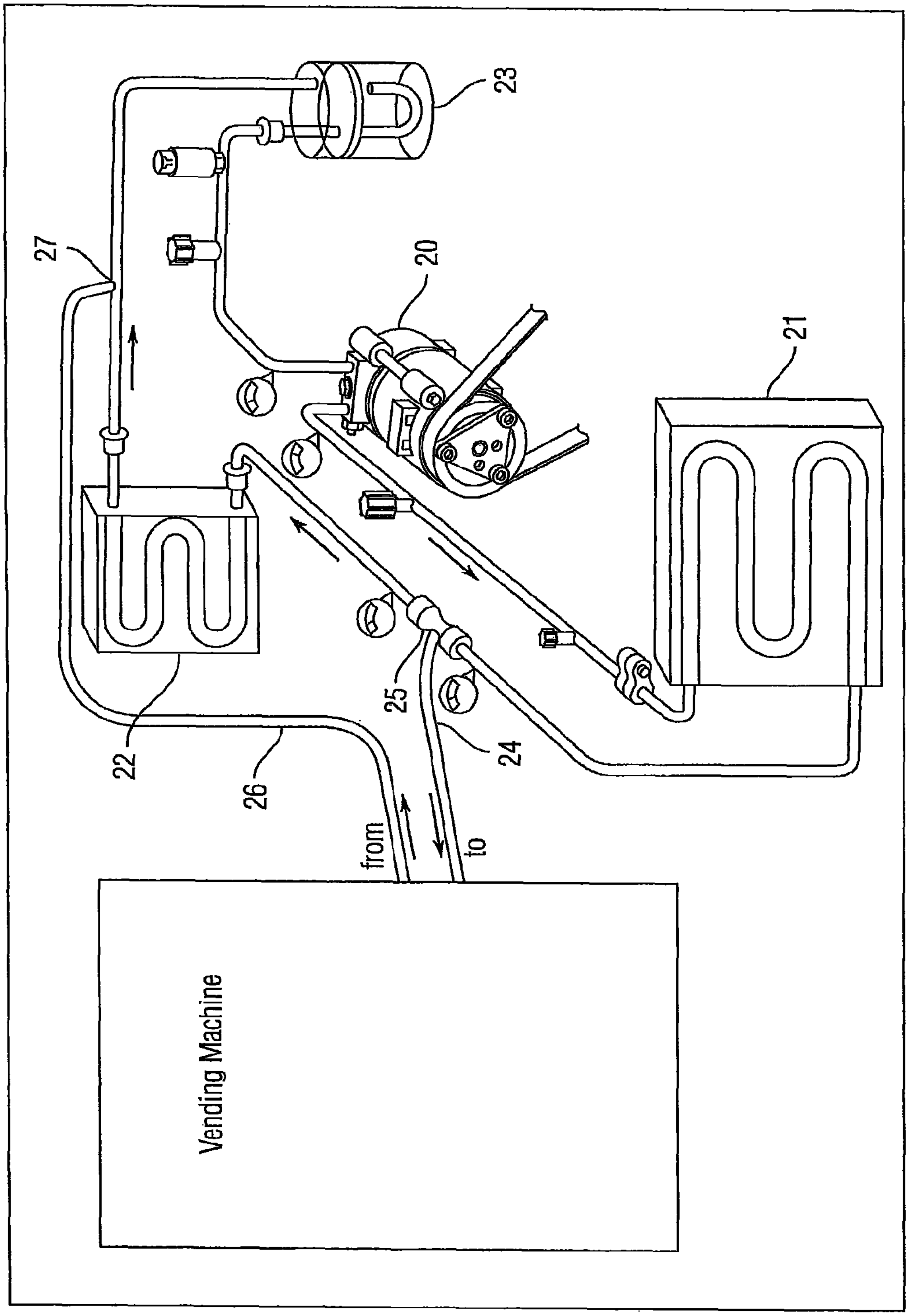
FIG. 2 illustrates a perspective front view of an air-conditioning system of a taxicab.

The vending machine 14 can include its own refrigeration system or, optionally, the vending machine 14 can be connected to the taxicab's air-conditioning system in order to provide at least part of the refrigeration system. Referring now to FIG. 2, the taxicab's air-conditioning system includes a compressor 20, a condenser 21, an evaporator 22, and a suction accumulator 23. A refrigerant gas flows between these elements to provide air-conditioning for the taxicab in a conventional manner. An intake pipe 24 is connected between the taxicab's condenser 21 and evaporator 22 via a T-connection 25. At least a portion of the refrigerant gas is diverted to the vending machine 14. The portion of the diverted refrigerant enters an evaporator that is a part of the vending machine that provides cooling to the vending machine. A return pipe 26 returns the low pressure diverted refrigerant back to the taxicab's air-conditioning system downstream of the taxicab's evaporator 22 via a T-connection 27. Both the diverted refrigerant gas and refrigerant gas that remained in the taxi's air-conditioning system enter the suction accumulator 23. The gas is then compressed via compressor 20 and enters the condenser 21 where the heat exits the system. The cycle is then repeated. Accordingly, a portion of the refrigerant bypasses the taxicab's evaporator 22 and enters an evaporator in the vending machine 14 in order to provide cooling to the vending machine. Copending application PCT/US2010/027762 provides further details of the components and functioning of the vending machine 14, which is incorporated by reference in its entirety as if set for herein.

The vending machine 14 can therefore be connected to the taxicab's existing air-conditioning system with relatively little modification. The T-connections are added and additional refrigerant gas is added to the system to accommodate for the extension tubes leading the vending machine and the need to divert a portion of the gas to the evaporator of the vending machine. In addition, a valve, such an electromagnetic solenoid valve, is added to the system so that the taxicab's evaporator 22 can be completely bypassed when air-conditioning is not desired, e.g., in the winter. Accordingly, refrigerant gas can continue to enter the vending machine's evaporator to keep the vending machine cool, but does not enter the taxicab evaporator 22 so that unwanted air-cooling in side the taxicab does not occur.

Figure 3A:
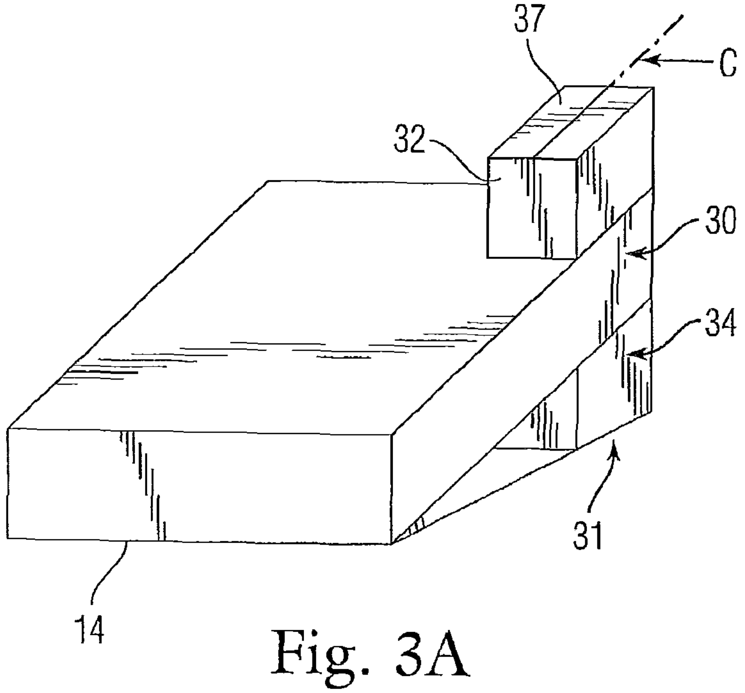
FIG. 3*a* illustrates a schematic sectional front view of automatic equipment, according to the embodiment of FIG. 1.
Figure 3B:
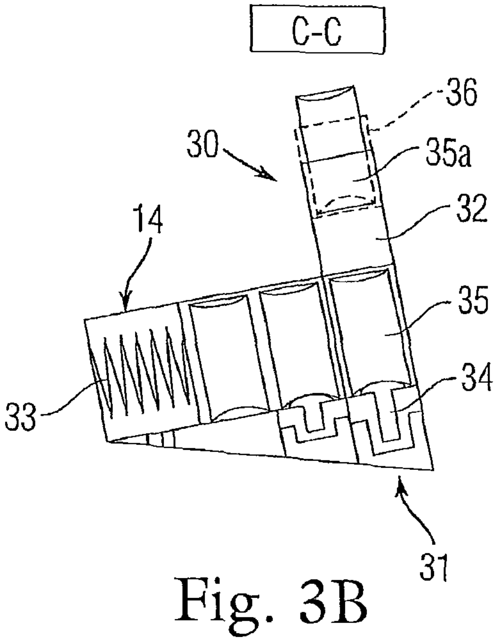
FIG. 3*b* illustrates a schematic sectional view along C-C of FIG. 3*a;*

Referring to FIGS. 3A and 3B, the vending machine 14 is mounted horizontally in the trunk area 10 of the taxicab and at a slight inclination. The vending machine 14 is similar to the vending machine described in the copending application PCT/US2010/027762, and further includes an elevator 30 for lifting the vended items from a first position in the trunk area 10 to a second position that is accessible from the rear passenger salon 7. The elevator can comprise a duct 31, a solenoid 34, and an access compartment 32. The duct 31 has a lower portion that is communication with the vending machine 14. The solenoid 34 is located at the lower portion of the duct 31 and lifts a vended item 35*a* upwardly through the duct 31. The duct 31 extends upwardly through the rear deck 12. The access compartment 32 is connected to an upper portion of the duct 31. As discussed below, the vending machine is in communication with a control system that allows a passenger to view and select the items contained in the vending machine while the vending machine itself is remotely located in the trunk or elsewhere. When one of the vending items is selected for vending by the passenger a signal is sent from the control system to the vending machine that causes the vending machine to vend the selected item. Once the vending machine receives the signal, one of the selected vending items 35*a* is pushed by spring 33 to a position over the solenoid 34. The movement of the selected item to the position over the solenoid 34 comprises conventional manipulation understood by those of skill in the art and will vary depending on the particular vending machine implementation chosen. The solenoid 34 lifts the item 35*a* upwardly through the duct 31 until the item enters the access compartment 32. The access compartment 32 is optionally provided with a door 37. When the item reaches the access compartment 30 the passenger can open the door 37 and remove the vended item 35*a*. Alternatively, the access compartment 30 can receive and hold the item until the passenger takes the item. The vending machine can send a signal to the control system indicating that the vending item is in compartment 30 and is ready for the passenger. The control system can than cause an alert to be displayed telling the passenger where it can receive the vended item. A sleeve 36 may optionally be provided to hold irregularly shaped items. The sleeve 36 assists in the transport of moving items of various shapes and sizes within the duct 31 of the elevator 30.

Figure 4:
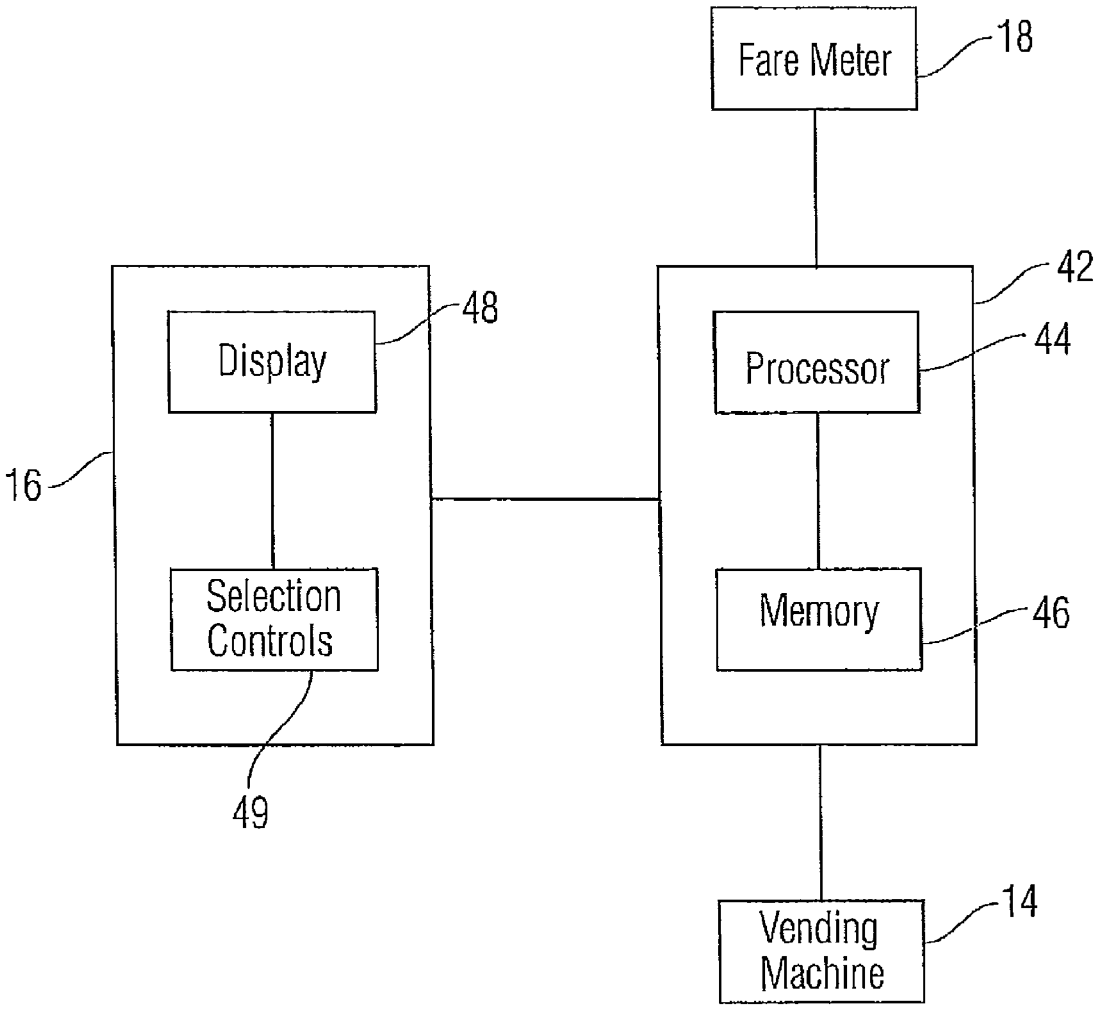
FIG. 4 illustrates a block diagram of the vending control system.

Referring now to FIG. 4, a control system is described that supports the vending of one or more items to a passenger located in a rear passenger salon of a taxicab. The control system includes a computer 42 that has a processor 44 and a memory 46. The computer 42 is in communication with a user interface 16 that includes a display 48 that is oriented toward the rear passenger salon for viewing by the passenger and selection controls 49. Alternatively, the selection controls can be provided in the form of selectable buttons or switches located adjacent the display 48. The display 48 can be a touch screen display that can be configured to display selection controls such that touching the screen operates to select the selection controls. The computer 42 is in communication with the fare meter 18 in order to receive information relating to the transit of the passenger from one location to another and the associated fare. The computer 42 is also in communication with the vending machine 14 located within the taxicab in order to send signals to the vending machine that cause the vending machine to vend an item. In part, the computer 42 cab be part of a conventional system for providing in salon entertainment and/or collecting a fare payment from the passenger. In relevant part, the computer executes code that implements a control scheme as described next.

The computer 42 includes a plurality of code modules stored in the memory and executable in the processor to perform the functionality described below. While plural code modules are described, the code can be included in a single program or in additional or fewer modules than in the example that follows. A first code module configures the processor to receive information from the fare meter 18 in relation to transit of the passenger from one location to another and to calculate a fare. In other words, a "taxi meter" as known in the art tracks movement of the taxicab as well as the passage of time (e.g. when the taxi is idle), and applies relevant rates from a schedule or otherwise to calculate the fare owed by the passenger. The taxi meter can calculate the fare and provide it to the first code module, but the final fare, as described below, will take into account any vended items.

A second, optional code module configures the processor to present entertainment information to the passenger on the display. The entertainment information can be in the form of short television clips, news videos, or internet access. A third code module configures the processor to provide interactive selection controls on at least a portion of the display, wherein the display is a touch screen display. The third code module responds to interaction with the selection controls by the passenger by causing a control signal to issue to a vending machine within the taxicab concerning the item to be vended to the passenger that corresponds to the use of the selection controls. The third code module provides the first code module with information in relation to a cost of the item for inclusion in the calculation of the fare that is to be charged to the passenger. This causes the final fare amount to change as compared to the relevant rate for the taxi ride. A fourth code module configures the processor to output for payment by the passenger the calculated fare in view of the received information in relation to the transit of the passenger and in view of the item vended to the passenger, and to collect the calculated fare from the passenger.

As such, the various code modules can communicate through the computer or a local connection to the fare meter and/or vending machine in order to cooperate to vend items and provide a unified payment option to the passengers for the ride and any vended items.

Figure 5A:
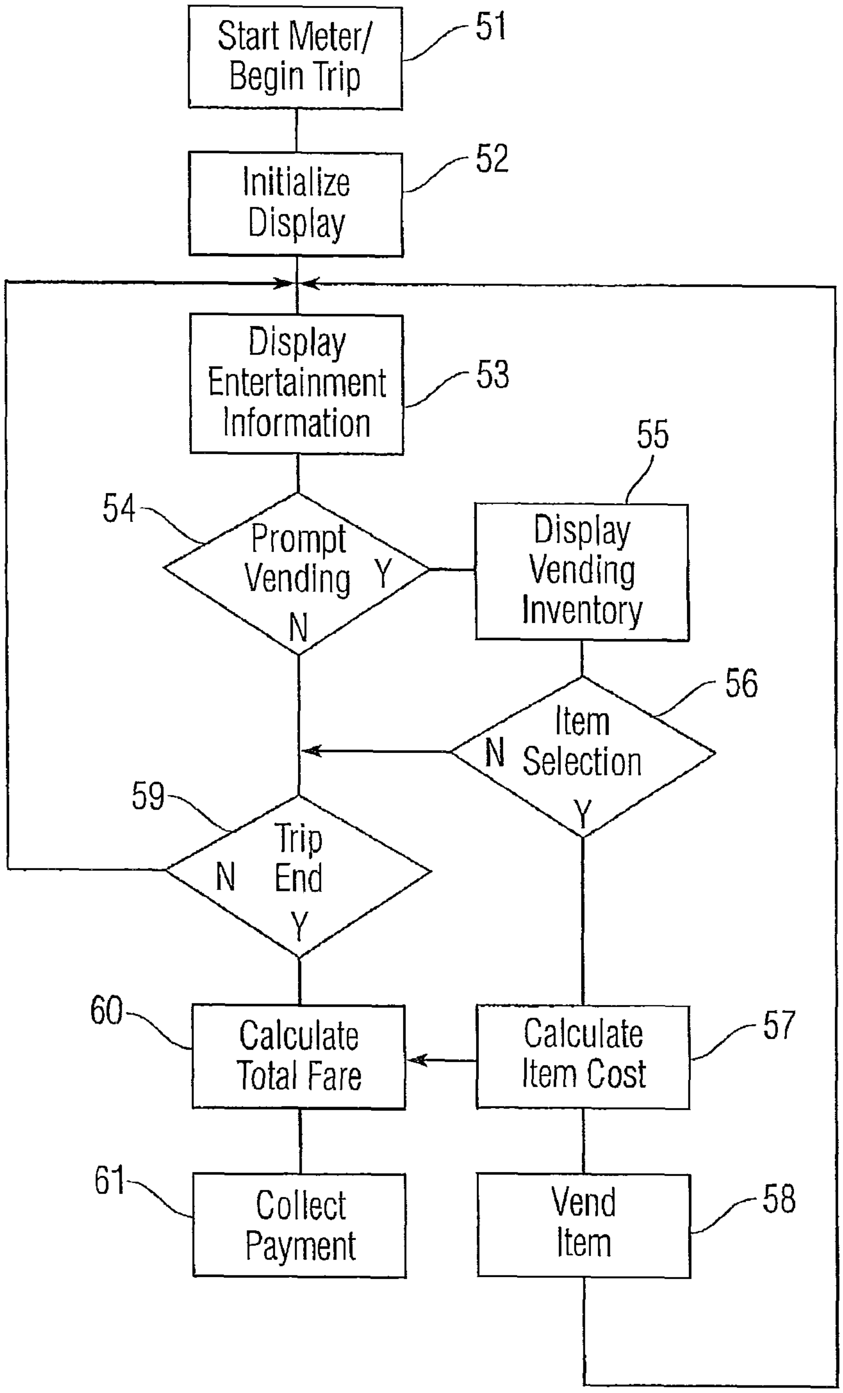
FIG. 5*a* is a flow chart illustrating operation of the vending control system.
Figure 5B:
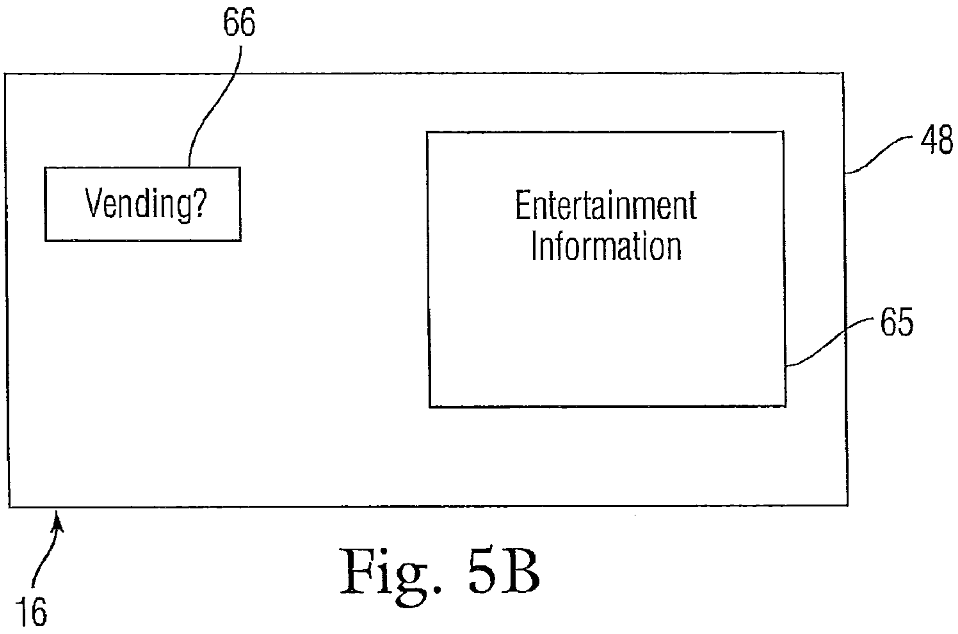
FIG. 5*b* illustrates a diagram view of a user interface in a first condition.
Figure 5C:
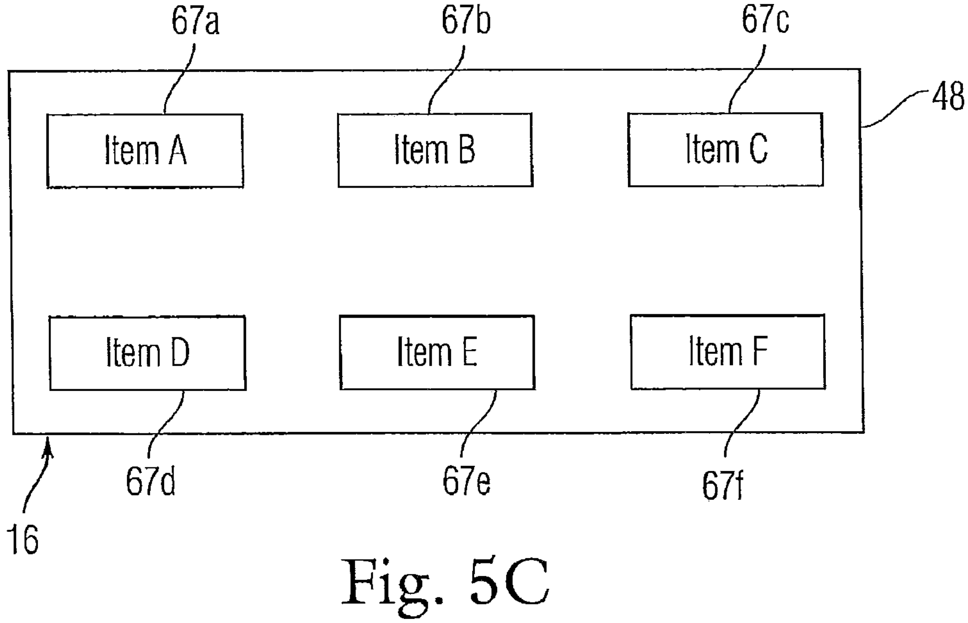
FIG. 5*c* illustrates a diagram view of a user interface in a second condition.

Referring now to FIGS. 5A-5C, an example of operation of the vending control system is described, such as from the execution of the third code module. When a passenger enters the taxicab, the fare meter 18 is started by the driver. At step 51 the computer with the software modules operating therein receives information from the fare meter that the trip has started. At step 52 the display is initialized by the computer and at step 53 the display displays entertainment information to the passenger. In addition to displaying the entertainment information, the display displays a selection control at step 54 prompting the passenger if he or she would like to view vending machine information. At this point, the display 48 can be configured as shown in FIG. 5B such that the entertainment information is displayed in a first window 65 on a portion of the display and a selection control 66 displayed on another portion of the display. If the passenger wishes to view the items that are available for vending, the passenger touches the selection control 66 displayed on the display. If the passenger touches the selection control 66, the system proceeds to step 55 in which a plurality of selection controls 67*a-f* are displayed on the display that correspond to items A-F that are contained in the vending machine and are available for vending to the passenger. Items A-F can be various drinks, food items, or non-food items that are contained in the vending machine. At step 56, the passenger can select a desired item by touching one of the selection controls 67*a-f* on the display. If the passenger selects a desired item, the system proceeds to step 57 in which the cost of the selected item is determined. The impact on the total mount owing for the taxi ride and any vended items is calculated at step 60, which is discussed below. The system proceeds to step 58 in which a control signal is sent to the vending machine that causes the selected item to be vended. After the item is vended, the system returns back to step 53 and the passenger can select further items, if desired.

If the vending prompt is not selected at step 54 or an item is not selected at step 56, the system proceeds to step 59 in which the system checks to see if the trip has ended. If the trip has not ended, the system returns back to step 53. If the trip has ended, the total fare is calculated at step 60. At step 60 information relating the cost of the trip is received from the fare meter and/or the first code module and information relating to the cost of items that have been vended is received, such as from the third code module described above, and these costs are added to calculate the total amount that is to be collected from the passenger. The cost of the trip may also include additional surcharges or cost structures such as a surcharge for additional passengers, differing cost structures if the trip passes through certain zones, or if the trip occurs at night. At step 61 the total cost is presented to the passenger for collection of the appropriate amount of money, such as by the fourth code module described above. The money can be collected via the processing of a credit card or money can be collected by the driver. Collection is by the passenger swiping or otherwise identifying a selected credit or debit card for processing the total cost as a single transaction. Alternatively, the passenger can bay the total amount in cash.

After the taxi driver's shift is over, the computer can then provide the driver separate receipt totals for the total sales relating to transportation of passengers, tips, and the total sales relating to the vending of items. The separate receipts totals will help the taxi driver if the taxi driver both leases the taxicab and the vending machine equipment and needs to pay separate parties.

One of the many advantages of the vending system of the present invention is that the trip fare and the vending costs are collected together. This provides convenience to the passenger because there is no need pay separate transactions for the vending of items and the trip costs. The payment can be collected in one step. In addition, the vending machine can be integrated into existing systems in the taxicab, for instance, the interface 16 can provide signals, via the forth code module, back to the fare meter to print a receipt for the passenger that has the total amount paid for the trip, any vended items, and the tip. Optionally, the cost of vended items and/or the tip can be combined into a single amount that has been paid to have a receipt without breakdowns of costs. As shown in FIG. 2 and discussed above, the vending machine can be integrated into the taxicab's existing air-condition system with relatively minor modifications.

The invention claimed is:

1. A refrigerated vending system for installation in a taxicab, the taxicab having a driver area, a trunk area, and a rear passenger salon having a rear passenger seat, the vending system comprising:

a refrigerated vending machine disposed in the trunk area, the vending machine being capable of vending items stored within the vending machine;

an elevator in communication with the refrigerated vending machine and in communication with the rear passenger salon, wherein the elevator receives a vended item from the vending machine at a first position in the trunk area and is capable of moving a vended item to a second position that is accessible from the rear passenger salon;

wherein the taxicab includes a rear deck extending behind the rear passenger seat and separating the trunk area and the rear passenger salon, the elevator having a duct that has one end in communication with the vending machine and the duct extends through an access defined by the rear deck into the passenger salon at a location behind the rear passenger seat so that the other end of the duct is in communication with the rear passenger salon;

a user interface accessible from the rear passenger salon, the user interface having a display for displaying information and selection controls corresponding to the information displayed on the display;

a processor;

a memory;

at least one module comprising code stored in the memory and executable in the processor so as to:

update the display with information concerning the items stored within the vending machine; and respond to the selection controls of the user interface by causing the vended item to move to the first position and thereafter causing the elevator to move to the second position.

2. The refrigerated vending system of claim 1, wherein the elevator further includes a solenoid that moves the vended item in the duet from the first position to the second position.

3. The refrigerated vending system of claim 2, wherein the elevator further includes an access compartment in communication with the other end of the duct, the access compartment being sized and shaped to receive and store the vending item in the second position.

4. The refrigerated vending system of claim 1, wherein the display is a touch screen display that senses passenger interaction with the touch screen.

5. The refrigerated vending system of claim 1, wherein the at least one module further comprises code stored in the memory and executable in the processor so as to:

update the display with alert information indicating that an item has been vended.

6. A control system in support of vending one or more items to a passenger in a rear passenger salon of a taxicab, comprising:

a computer having a processor and a memory;

a display oriented toward the rear passenger salon for viewing by the passenger;

a first code module stored in the memory and executable in the processor so as to configure the processor to receive information in relation to transit of the passenger from one location to another and to calculate a fare;

a second code module stored in the memory and executable in the processor so as to configure the processor to present entertainment information to the passenger on the display;

a third code module stored in the memory and executable in the processor so as to configure the processor to provide interactive selection controls on at least a portion of the display, wherein the third code module responds to interaction with the selection controls by the passenger by causing an item to be vended to the passenger that corresponds to the use of the selection controls and provides the first code module with information in relation to a cost of the item for inclusion in the calculation of the fare, and wherein the third code module causes a control signal to issue to a vending machine disposed in a trunk area of the taxicab concerning the item to be vended., the vending machine having an elevator in communication with the rear passenger salon, wherein the elevator moves the item to be vended from the trunk area to the rear passenger salon;

wherein the taxicab includes a rear deck extending behind the rear passenger seat and separating the trunk area and the rear passenger salon, the elevator having a duct that has one end in communication with the vending machine and the duct extends through an access defined by the rear deck into the passenger salon at a location behind the rear passenger seat so that the other end of the duct is in communication with the rear passenger salon; and a fourth code module stored in the memory and executable in the processor so as to configure the processor to output for payment by the passenger the calculated fare view of the received information in relation to the transit of the passenger and in view of the item vended to the passenger, and to collect the calculated fare from the passenger.

7. The system of claim 6, wherein the vending machine is refrigerated.

8. The system of claim 6, wherein the elevator receives the item from the vending machine at a first position and moves the item to a second position that is accessible from the rear passenger salon.

9. The system of claim 8, wherein the vending machine responds to control signal by causing the item to move to the first position and thereafter causing the elevator to move to the second position.

10. The system of claim 6, wherein the third code module configures the processor to provide the interactive selection controls on the portion of the display together with the presentation of entertainment information.

11. The system of claim 6, wherein the third code module configures the processor to provide the interactive selection controls on the portion of the display in lieu of the presentation of entertainment information.

12. The system of claim 6, wherein the first code module further configures the processor to calculate the fare so as to include a surcharge for one or more additional passengers.

13. The system of claim 6, wherein the first code module further configures the processor to calculate the fare so as to include a surcharge for one or more additional zones.

14. The system of claim 6, wherein the first code module further configures the processor to calculate the fare so as to include a nighttime surcharge.

* * * * *